United States Patent [19]

Kumasaka et al.

[11] Patent Number: 4,988,271
[45] Date of Patent: * Jan. 29, 1991

[54] APPARATUS FOR PRODUCING POLYURETHANE FOAM

[75] Inventors: Sadao Kumasaka; Satomi Tada; Koretoshi Katsuki, all of Tokyo; Osamu Fujii, Konosu; Tutomu Yamamoto, Kawagoe; Ryoji Nagamine, Hidaka; Kazuo Hashimoto, Kawagoe; Masao Idei, Kawagoe; Yosuke Sato, Kawagoe; Kazuo Ibata, Kawagoe, all of Japan

[73] Assignee: Human Industry Corporation, Tokyo, Japan

[*] Notice: The portion of the term of this patent subsequent to May 19, 2004 has been disclaimed.

[21] Appl. No.: 70,774

[22] Filed: Jul. 7, 1987

[30] Foreign Application Priority Data

Dec. 25, 1986 [JP] Japan ................... 61-307683
Mar. 12, 1987 [JP] Japan ................... 62-37415
Mar. 12, 1987 [JP] Japan ................... 62-57416
Mar. 12, 1987 [JP] Japan ................... 62-57417
Mar. 12, 1987 [JP] Japan ................... 62-57418
Mar. 12, 1987 [JP] Japan ................... 62-57419

[51] Int. Cl.$^5$ .................. B29C 39/42; B29C 39/44
[52] U.S. Cl. ..................... 425/73; 425/150; 425/171; 425/817 R; 264/101
[58] Field of Search ............ 264/DIG. 84, 101, 45.7, 264/310, 311; 425/150, 73, 171, 817 R

[56] References Cited

U.S. PATENT DOCUMENTS

| | | | |
|---|---|---|---|
| 3,291,873 | 12/1986 | Eakin | 264/54 |
| 3,366,718 | 1/1968 | Komada | 264/45.7 |
| 3,878,279 | 4/1975 | Sorrells et al. | 264/101 X |
| 3,970,732 | 7/1976 | Slaats et al. | 264/101 X |
| 3,996,322 | 12/1976 | Snelling et al. | 264/310 X |
| 4,014,967 | 3/1977 | Hattenberger et al. | 264/DIG. 84 |
| 4,088,722 | 5/1978 | Marjoram | 264/DIG. 84 |
| 4,285,893 | 8/1981 | Contastin | 264/101 X |
| 4,416,841 | 11/1983 | Corea et al. | 264/101 X |
| 4,601,864 | 7/1986 | Vreenegoor | 264/101 X |
| 4,666,393 | 5/1987 | Kumasaka et al. | 425/817 R |

FOREIGN PATENT DOCUMENTS

| | | | |
|---|---|---|---|
| 0023749 | 2/1981 | European Pat. Off. | 264/101 |
| 0044226 | 1/1982 | European Pat. Off. | |
| 2101238 | 11/1975 | Fed. Rep. of Germany | 264/101 |
| 2517591 | 10/1983 | France | 264/DIG. 84 |
| 61613 | 5/1968 | German Democratic Rep. | 264/DIG. 84 |
| 60-23720 | 1/1978 | Japan | 264/310 |
| 61-77214 | 5/1986 | Japan | 264/DIG. 84 |
| 2100175A | 12/1982 | United Kingdom | 264/101 |

Primary Examiner—David Simmons
Assistant Examiner—Allan R. Kuhns
Attorney, Agent, or Firm—Frishauf, Holtz, Goodman & Woodward

[57] ABSTRACT

A method of producing polyurethane foam slab by allowing a urethane foam stock solution in a tank to expand in a reduced pressure. The flatness of the top of the polyurethane foam is secured by providing a lifting jig or a plate within the tank, or by rotating the tank. An apparatus for carrying out the method is also provided.

2 Claims, 11 Drawing Sheets

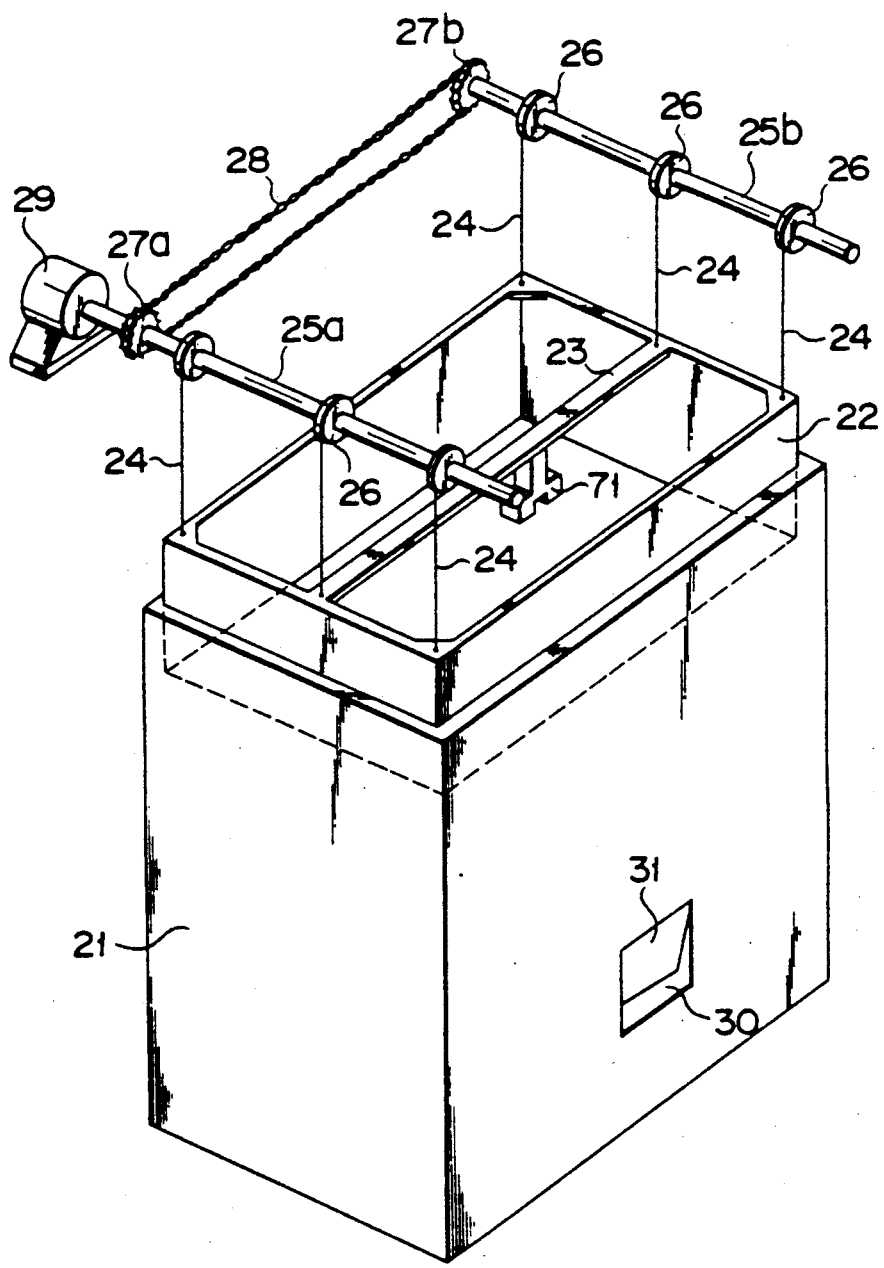
F I G. 5

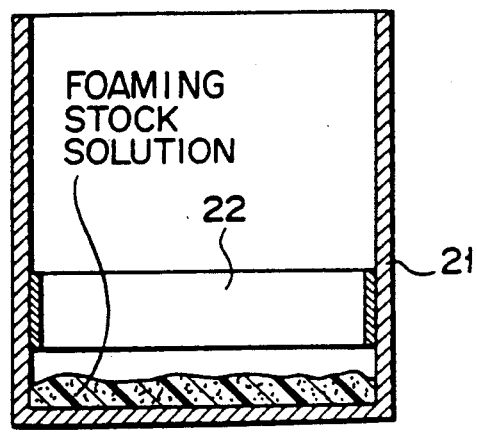
F I G. 6A
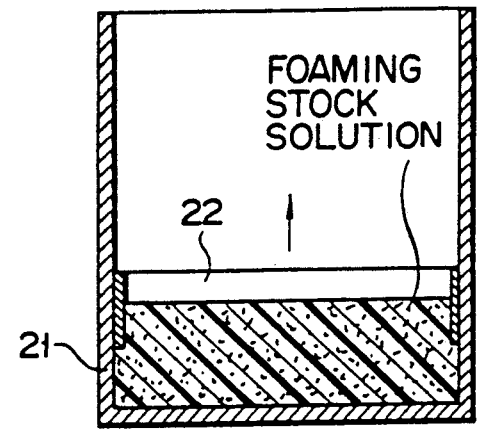
F I G. 6B
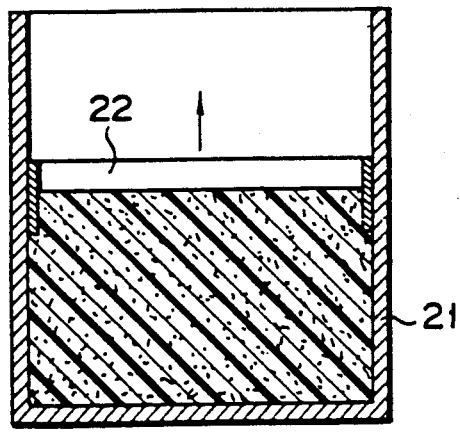
F I G. 6C
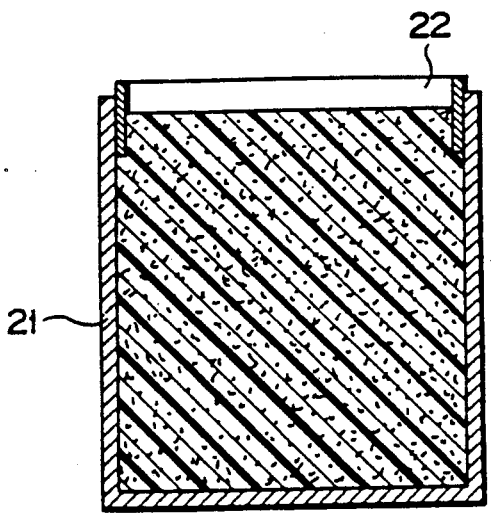
F I G. 6D

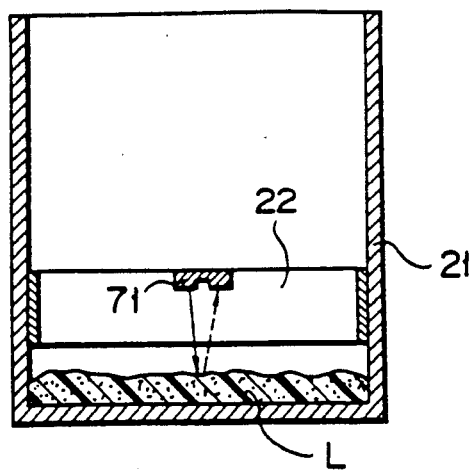
F I G. 8A
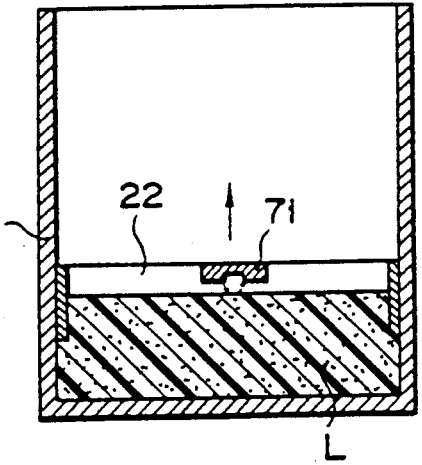
F I G. 8B
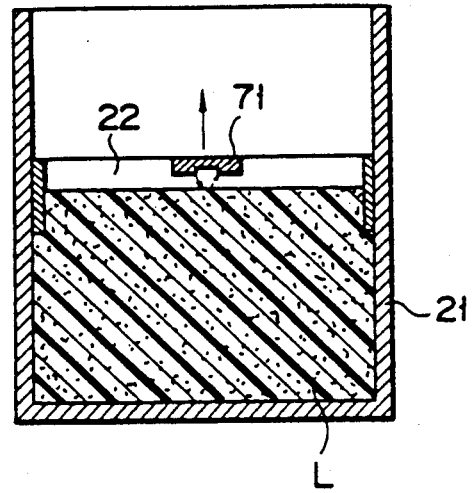
F I G. 8C
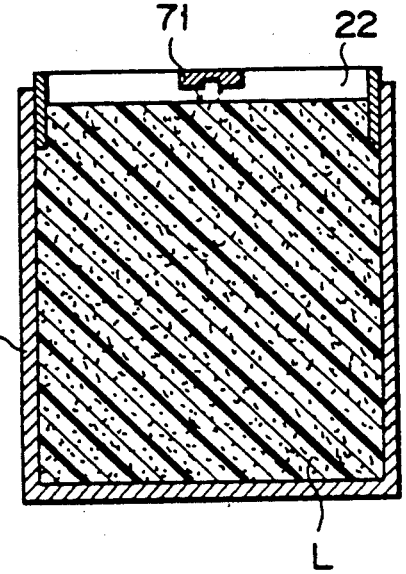
F I G. 8D

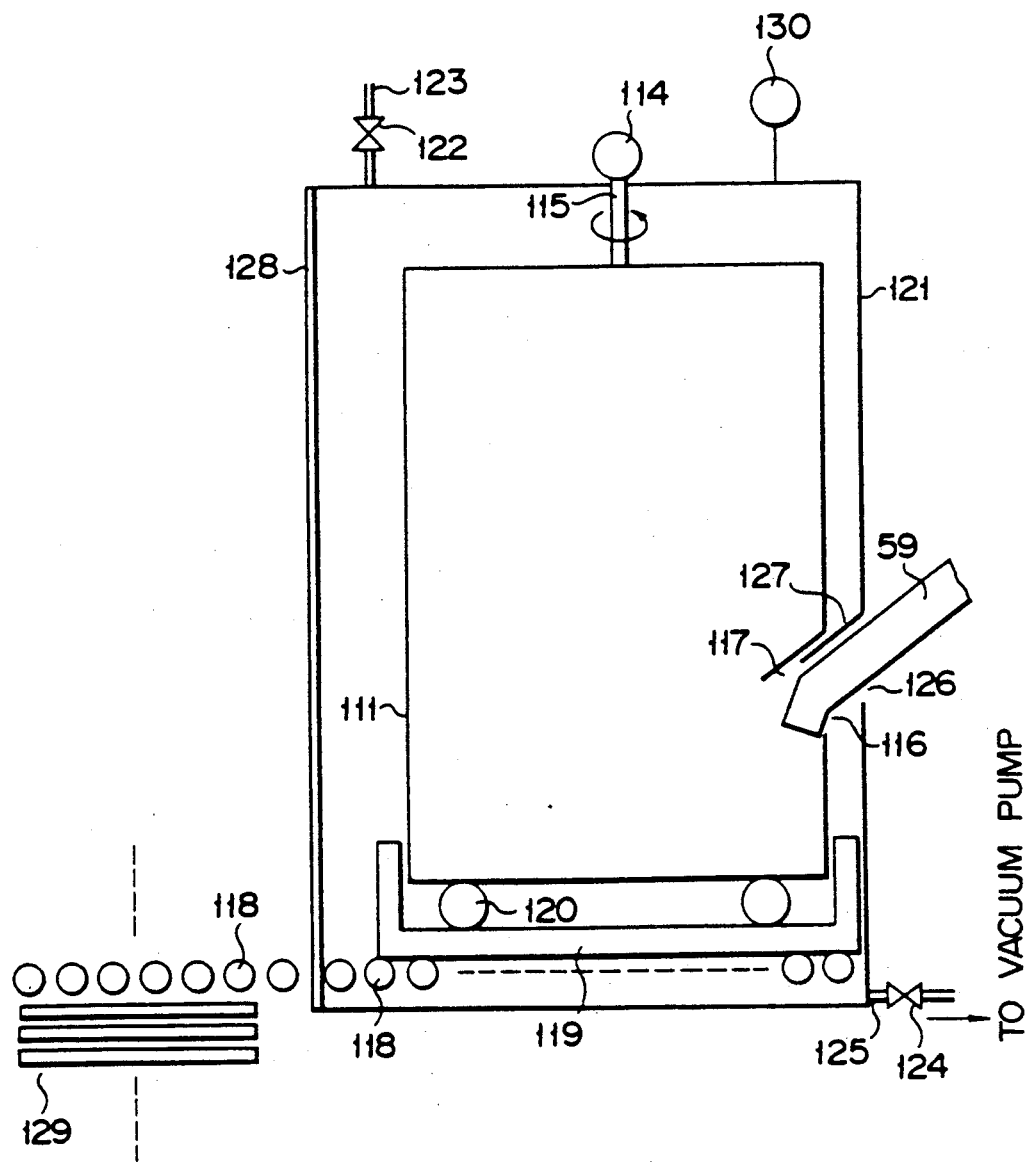
F I G. 9

FIG. 13  TO VACUUM PUMP

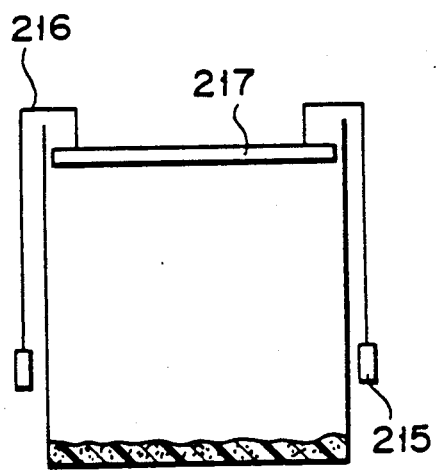
F I G. 15A
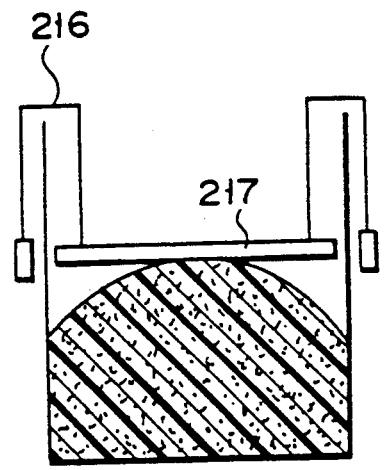
F I G. 15B
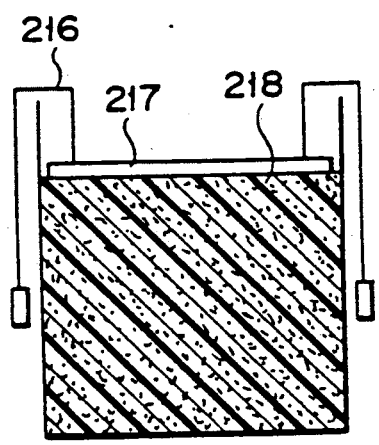
F I G. 15C

APPARATUS FOR PRODUCING POLYURETHANE FOAM

BACKGROUND OF THE INVENTION (a) Field of the Invention

The present invention relates to a method and an apparatus, both for producing ultra-low-density polyurethane foam having a flat top.

(b) Description of the Prior Art

Polyurethane form has been put to various uses. A variety of products, ranging from one having a low density to one having a high density, have been produced for various purposes.

The conventional method of adjusting the density of a polyurethane foam is to increase or decrease the amount of the foaming agent (usually, water) or the foaming promotor (a low-boiling point solvent, such as trichloromonofluoromethane or methylene chloride). To produce a low-density polyurethane foam, much water is used to enhance expansion ratio.

Foaming of polyurethane is achieved by the carbon dioxide gas generated by reacting organic isocyanate with water. In the conventional method, water must be used in a great amount in order to produce a low-density urethane foam. The use of water in large quantities, however, results in the following problems.

(1) The reaction between isocyanate and a large amount of water generates much heat, raising the internal temperature of the resultant foam. Consequently, the foam is likely to be scorched and discolored. Thus, it is necessary to add a scorch retardant.

(2) At most 6 to 7 parts by weight of water can be added to 100 parts by weight of polyol to produce a lowdensity polyurethane foam. Such a polyurethane foam is very likely to be scorched. In the worst case, the foam will cause a fire.

(3) Since a large amount of organic isocyanate, trichloromonofluoromethane, or the like must be used, the gas loss of the resultant foam is great, inevitably reducing the yield.

In the conventional method, a polyurethane foam is produced as is shown in FIG. 1. That is, first, polyurethane foam stock solution is poured into large foaming mold 1. Then, the solution is foamed, and the foamed product is cured, thereby producing a polyurethane foam slab 2. In this case, the inner surfaces of mold 1 are covered with mold-releasing paper (not shown). This method, called "batch" method, can be performed in a relatively small space. It is also advantageous in that a slab of any desired shape can be obtained by using a foaming tank of that shape.

The batch-type method, however, has a drawback. After the polyurethane foam stock solution is stirred and then poured into mold 1, the foaming proceeds, whereby the surface of the solution rises in mold 1. As the surface of the solution rises, the viscosity of the solution increases. Hence, the friction between the inner surfaces of mold 1 and the surfaces of the foaming slab, except for the top and bottom thereof, increases and hinders the foaming. Consequently, completely foamed slab 2 has a rounded top as is shown in FIG. 1; it cannot have a flat top. Inevitably, it is necessary to cut the top portion of slab 2 to provide a slab having a flat top. This means that the batch method requires an additional step of cutting a slab, and involves wasting of material (i.e., the rounded top portion of slab 2).

SUMMARY OF THE INVENTION

Accordingly it is an object of the present invention to provide polyurethane foams of various densities from the same foam stock solution.

Another object of the invention is to provide a method and an apparatus, both for producing a low-density polyurethane foam slab having a flat top.

According to the present invention, some stocks selected from a group consisting of polyol, organic isocyanate, amine catalyst, silicone oil, tin catalyst, water (used as foaming agent), pigment, physical-property improver such as filler, and other components usually used in preparing a polyurethane foamable reaction mixture are mixed, thus forming a polyurethane reaction mixture. The reaction mixture is foamed in a reduced-pressure atmosphere, whereby a foam slab is obtained. In other words, the density of the slab is determined by changing the pressure of the atmosphere in which the reaction mixture is foamed, not by changing the composition of the reaction mixture. The foam slab may be held under the reduced pressure so that it is not locally overheated.

According to the invention, there is provided a method of producing polyurethane foam having a flat top. In this method, first, a foaming mold is placed within a chamber. Then, a polyurethane foamable reaction mixture is stirred and poured into the mold. A hollow cylindrical jig having both ends open is provided in the mold. This jig can move up and down, sliding on the inner surfaces of the foaming mold. The pressure within the chamber is reduced. As the foaming reaction proceeds, the surface of the reaction mixture rises. The hollow cylindrical jig moves up, along with the surface of the reaction mixture.

The hollow cylindrical jig may have an ultrasonic sensor for detecting the distance between the top surface of the reaction mixture and the top of the jig. When this distance becomes shorter than a predetermined value, the sensor outputs an electric signal to a drive device. In response to this signal, the drive device lifts the jig, along with the surface of the stock solution.

According to the invention, there is provided a second method of producing polyurethane foam having a flat top. In the second method, a rotatable foaming mold is placed within a chamber. Then, a polyurethane foamable reaction mixture is stirred and poured into the mold. The pressure within the chamber is reduced. The mold is rotated during the foaming reaction, thus applying a centrifugal force to the foamable reaction mixture.

According to the invention, there is provided a third method of producing polyurethane foam having a flat top. In the third method, first, a polyurethane foamable reaction mixture is stirred and poured into a foaming mold. As the foaming reaction proceeds, the surface of the reaction mixture rises. After the foaming reaction has proceeded about 70%, and immediately before the completion of the reaction, a weight having a flat lower surface is put on the top surface of the reaction mixture, thereby stopping the top surface of the mixture from rising.

BRIEF DESCRIPTION OF THE DRAWINGS

FIG. 5 is a perspective view showing the foaming mold removed from the apparatus of FIG. 4;

FIGS. 6(A) to 6(D) are sectional views sequentially showing the operations of employing the foaming mold of FIG. 4;

FIGS. 8(A) to 8(D) are sectional views sequentially showing foaming steps with the sensor in FIG. 7;

FIG. 9 is a schematic view showing the foaming mold of an apparatus for producing polyurethane foam according to another embodiment of the present invention;

FIGS. 15(A) to 15(C) are sectional views sequentially showing the foaming states of the case of foaming in the mold of FIG. 13.

DETAILED DESCRIPTION OF THE PREFERRED EMBODIMENTS

Figure 1:
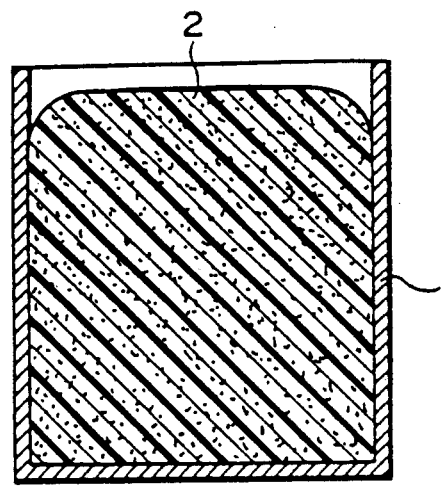
FIG. 1 is a sectional view showing a conventional apparatus for producing polyurethane slab.
Figure 2:
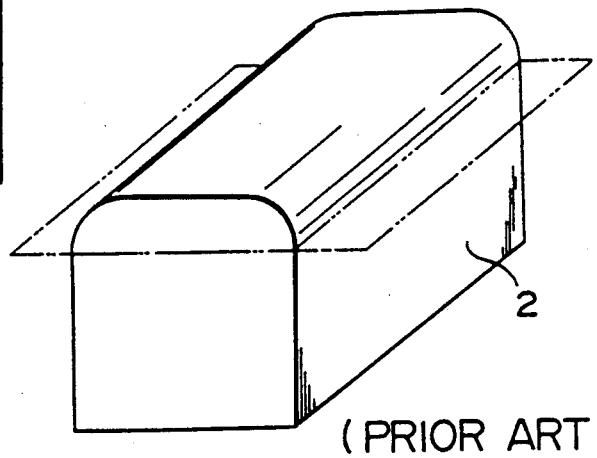
FIG. 2 is a perspective view of polyurethane slab obtained by a conventional method.

The stock components of the foamable reaction mixture in the present invention may employ those heretofore used as they are. For example, as polyol polyether polyol or polyester polyol may be employed. As organic isocyanate tolylene diisocyanate, 4,4'diphenylmethane diisocyanate, polymeric MDE, or naphthalene diisocyanate may be used. Additionally, amine catalyst, tin catalyst, foaming agent (water), foam stabilizer (silicone oil), pigments or filler may be employed in adequate combination as required for properties.

As an example of providing predetermined reduced pressure atmosphere in the present invention a foaming container is, for example, constructed as a reduced pressure chamber, and the chamber may be evacuated by a pump. Or, a foaming container may be contained in a reduced pressure chamber separately prepared to foam the reaction mixture. In any event, a batch type process may be readily employed. However, when a large-scale reduced pressure chamber is used, a continuous process may be applied.

The reduced pressure atmosphere used in the present invention varies according to the mixing components and the density of the product to be used. The pressure of the atmosphere is preferably determined ordinarily from ambient atmospheric pressure to approx. 50 mmHg or more of pressure reduction, and optimally determined from the ambient atmospheric pressure of a range from 1000 to 500 mmHg of pressure reduction.

The time of reducing the pressure of the reduced pressure atmosphere in the invention may be immediately after pouring the foamable reaction mixture, or may also be preferably after the rise of the foamable reaction mixture starts from when the foaming reaction has started.

Since the foaming operation is executed with carbon dioxide gas under reduced pressure in the invention, the operation is intensified. More specifically, the formation of gas foam depends upon the escaping strength of the carbon dioxide gas produced in the foamable reaction mixture, and the escaping strength is determined according to the relative degree of the produced carbon dioxide gas vapor pressure to the ambient atmospheric pressure. Thus, even if the entire quantity of the produced carbon dioxide gas is the same and the partial pressure is the same, the lower the ambient atmospheric pressure is, the larger the escaping strength becomes. Further, since the produced carbon dioxide gas is readily volatilized, the ratio of effectively foaming the reaction mixture is improved even if the produced quantity is the same.

Even if the foamable reaction mixture of the same content are employed, the evaporation efficiency of the produced carbon dioxide gas is improved, the foaming magnification is increased by intensifying the foaming operation, thereby providing, for example, low density (5 to 10 kg/m$^3$) polyurethane foam.

EXAMPLE

| | |
|---|---|
| Polyether polyol | 100,00 wt. parts |
| (3000 of molecular weight, 3 functionality, 56 of OH value) | |
| triethylenediamine | 0.08 wt. part N-ethyl |
| morpholine | 0.5 wt. part |
| Silicone oil | 1.4 wt. part |
| Dibutyltin dialaurate | 0.35 wt. part |
| H$_2$O | 4.0 wt. parts |
| tolylene diisocyanate | 53.0 wt. parts |

Polyurethane foamable reaction mixture containing the above-mentioned components was prepared, and the polyurethane foam was produced in a batch system as will be described.

Figure 3:
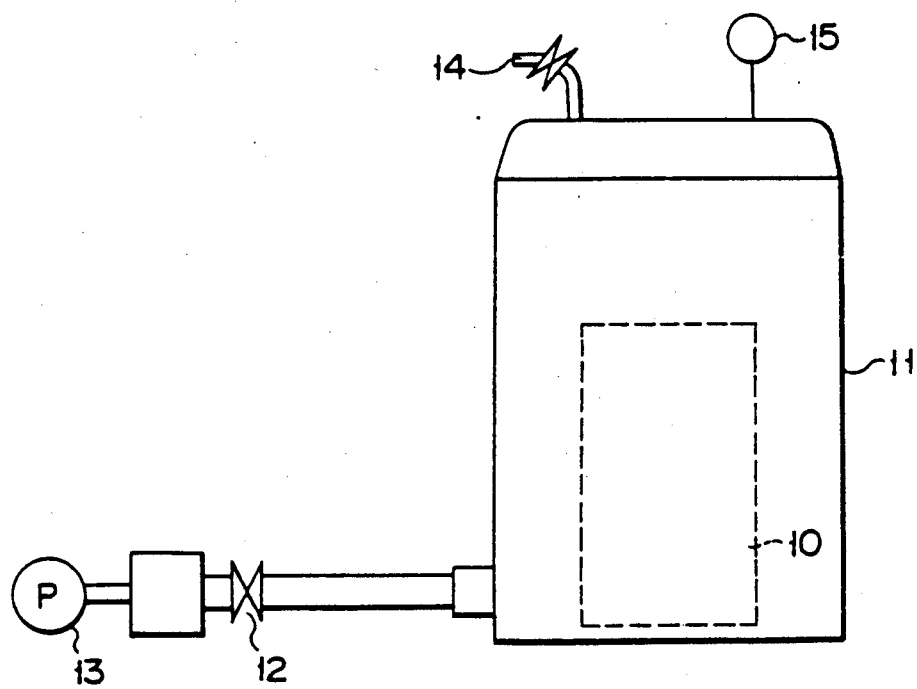
FIG. 3 is a schematic view showing an example of an apparatus for executing the method for producing the polyurethane slab according to the invention.

The foamable reaction mixture prepared as described above was poured in foaming mold 10 contained in reduced pressure chamber 11 shown in FIG. 3, a cover of chamber 11 was closed and sealed. Then, after the rise of the foamable reaction mixture has started, valve 12 was opened, chamber 11 was connected to vacuum pump 13, and chamber 11 was then evacuated to be reduced in a predetermined amount in pressure. After the foaming was completed under the reduced pressure, feed conduit 14 was opened to return the pressure in chamber 11 to the ordinary atmospheric pressure, and polyurethane foam was removed from mold 10. Whether the foam was produced under predetermined reduced pressure or not was always monitored by gauge 15 attached to chamber 11.

Polyurethane foams were produced by the above-described method with the pressure reduction amounts in chamber 11 of 100, 200, 300, 400 and 500 mmHg, and the properties of the products attained in the respective pressure reduction amounts were examined. As comparison example, the same foam stock solution was foamed similarly under the ambient atmospheric pressure, i.e., 0 mmHg of pressure reduction amount, and the properties of the attained product were also examined. The results are indicated in Table 1.

TABLE 1

|  | Ex. 1 | Ex. 2 | Ex. 3 | Ex. 4 | Ex. 5 | C. Example |
|---|---|---|---|---|---|---|
| Pressure Reduction (mmHg) | 100 | 200 | 300 | 400 | 500 | 0 |
| Density (g/cm$^3$) | 0.0205 | 0.0156 | 0.0139 | 0.0125 | 0.0096 | 0.0238 |
| Hardness (kg/JIS) | 10.5 | 8.7 | 7.0 | 5.7 | 4.3 | 12.5 |
| Tensile strength (kg/cm$^2$) | 0.68 | 0.54 | 0.50 | 4.5 | 0.42 | 0.77 |
| Elongation (%) | 110 | 95 | 100 | 120 | 125 | 115 |
| Tear strength (kg/cm) | 0.45 | 0.42 | 0.41 | 0.38 | 0.35 | 0.47 |

As shown in the results Table 1, various polyurethane foams having different densities could be produced with the foamable reaction mixture of the same mixture content. Further, no scorch phenomenon was observed even on the low density product having 0.0096 g/cm$^3$.

In the products produced by the embodiment of the invention, the surface skin layer was considerably thinner than the product of the comparison example. This is presumed that oxygen partial pressure in the reduced pressure atmosphere is low and the deterioration of the surface property occurred due to the contact with the oxygen in the process of foaming was accordingly suppressed.

As other modified example of the invention the foamable reaction mixture may be further, after the foaming reaction is finished, held in the reduced pressure chamber for a proper time from the ambient atmospheric pressure to 50 to 500 mmHg of pressure reduction. Thus, the following advantages are provided by the pressure reduction process.

(A) Since polymerization reaction heat produced at foaming time is not enclosed therein but the heat is partly dispersed externally to be exhausted, scorch phenomenon and a fire of the conventional one can be prevented.

(B) Since the reaction heat is entirely uniformly dispersed when the heat is externally exhausted, the heat is not partially raised, but polyurethane foam having uniform properties can be produced.

(C) Polyurethane foam having high foaming magnification can be produced by the pressure reduction without using Freon of foaming assistant as the conventional method. Therefore, environmental problem which has heretofore occurred due to the exhaust of the Freon can be solved.

According to the present invention as described above, various polyurethane foams having different densities and particularly low density can be produced from the foamable reaction mixture of the Same mixture content without scorch phenomenon of the conventional one.

Embodiments of a method and an apparatus for producing urethane foam of reaction mixture under reduced pressure to provide urethane foam slab having flat top surface will be described.

Figure 4:
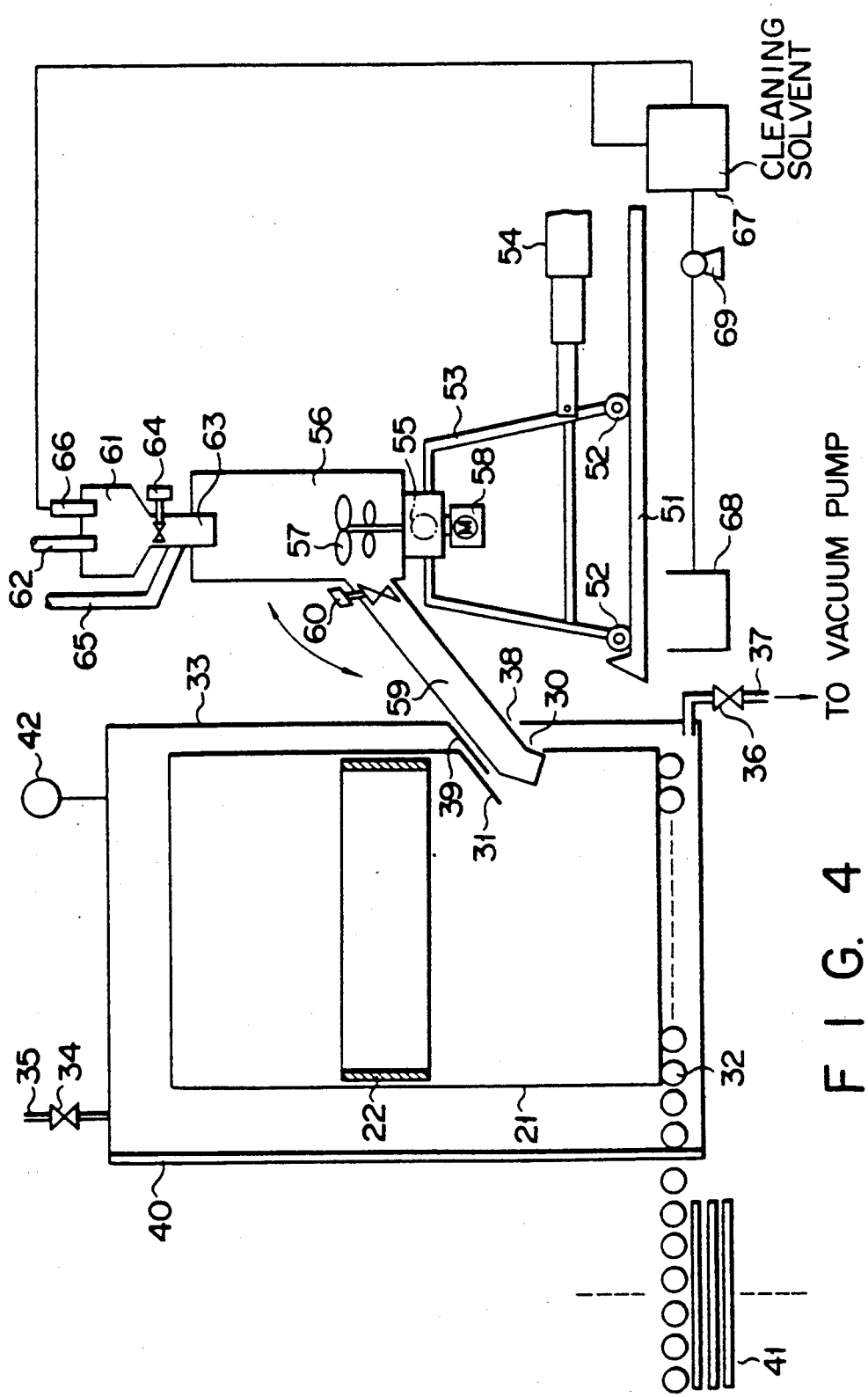
FIG. 4 is a schematic view showing an example of an apparatus for producing polyurethane slab according to the present invention.

First embodiment of the invention will be described with reference to FIGS. 4 to 6. FIG. 4 is an explanatory view of an apparatus for producing polyurethane foam according to the present invention, FIG. 5 is a perspective view of a foaming tank of the apparatus, and FIGS. 6(A) to 6(D) are explanatory views showing the operation of the apparatus.

In the drawings, the apparatus comprises large-sized foaming mold 21 having a flat bottom and an opened top. In FIG. 5, mold 21 is formed in a rectangular box shape having a foaming space of rectangular section. In mold 21 is slidably provided rectangular cylindrical lifting jig 22 opened at its opposite ends along its inside walls. Jig 22 is formed of steel plates such as stainless steel, iron or tin plates, plastic plates such as plastics of polyester, polycarbonate or melamine, or wood plates, and is preferably coated with parting agent or bonded with parting film on the surfaces.

A reinforcing bar 23 crossing substantially the center is provided in the top opening of jig 22. Lifting wires 24, are connected at one ends to jig 22, and at the other to winding rolls 26, provided on lifting rotational shafts 25a, 25b disposed above mold 21. Sprockets 27a, 27b are journaled respectively to shafts 25a, 25b, and sprocket chain 28 is wound around sprockets 27a, 27b. Driving motor 29 is coupled to one shaft 25a to rotatably drive shaft 25a. When motor 29 is driven to rotate one shaft 25a, other shaft 25b is rotated at the same speed through a sprocket mechanism. Thus, wires 24, are wound on or rewound from rolls 26 at equal speed with the result that jig 22 can freely elevate upward or downward. Foam reaction mixture inlet 30 is opened at the side wall of mold 21, and openable door 31 is provided in inlet 30. Shafts 25a, 25b are supported by bearings, not shown, which are, in turn, secured to the outer wall of mold 21. Mold 21 is placed on rollers 32.

Mold 21 is contained in reduced pressure chamber 33. A feed conduit 35 provided with solenoid valve 34 on the way is connected to the top of chamber 33. A suction conduit 37 provided with solenoid valve 36 on the way is connected to the bottom of chamber 33, and connected to a vacuum pump (not shown). Foam stock solution inlet 38 is opened at a position corresponding to inlet 30 at the side of chamber 33, and an openable door 39. Laterally openable door 40 for guiding mold 21 into or from chamber 33 is provided at the side wall of chamber 33. Conveyor 41 for conveying mold 21 and pressure gauge 42 attached to chamber 33 are provided as shown in FIG. 4.

Rails 41 are laid near chamber 33. Truck 53 having wheels 52 provided at respective legs is disposed on rails 51 to approach or separate mold 21 by the protrusion and the retraction of a piston in cylinder 54. Rotational shaft 55 is horizontally installed in truck 53, and cylindrical mixing and agitating tank 56 is pivotally secured to shaft 55. Shaft 55 is rotatably driven by a motor, not shown, and a transmission gear, thereby rotatably tilting tank 56 in a direction as designated by an arrow in FIG. 4. Agitating blades 57 are axially provided in tank 56, and rotatably driven by motor 58 mounted underneath tank 56. Foaming solution discharge conduit 59 is obliquely downwardly extended from the lower end of the side face of tank 56. Conduit 59 and tank 56 communicate through solenoid valve 60 provided in the boundary between conduit 59 and tank 56. organic isocyanate component metering tank 61 is disposed on the top of tank 56, and coupled through conduit 62 to an organic isocyanate supply source. Stock supply conduit 63 is provided at the lower end of tank 61, and solenoid valve 64 is provided between conduit 63 and tank 61. Polyurethane foam stock supply conduit 65 for supplying component except the isocyanate component such as polyol, catalysts, is coupled to conduit 63. Polyurethane foam stock cleaning solvent supply conduit 66 is attached to tank 61, and connected to cleaning solvent tank 67. Cleaning solvent waste reservoir 68 is installed, and connected through pump 69 to tank 67.

The operation of the apparatus of the construction as described above will be described.

As shown in FIG. 6(A), the inner surfaces of mold 21 are covered with parting paper in the state that jig 22 is lowered to a predetermined position, and the inner surfaces of jig 22 are also bonded with parting paper or coated with parting agent. Then, as shown in FIG. 4, mold 21 is contained in chamber 33 (in the state valves 34, 36 are closed), the piston of cylinder 54 is protruded or retracted to prepare polyurethane foamable reaction mixture in the state that tank 56 is retracted from tank 21. In other words, the organic isocyanate component is supplied through conduit 62 to tank 61, metered by tank 61, and valve 64 is opened to pour a predetermined amount of isocyanate component through conduit 63 to tank 56. Simultaneously, polyol and other stocks such as catalysts are poured from conduit 65 to tank 56. Subsequently, blades 56 are rotated to uniformly mix the contents in tank 56.

Then, cylinder 54 is driven to protrude its piston to move forward tank 56 to the position as shown in FIG. 4, and the end of conduit 59 is inserted from inlets 38, 30 into mold 21. In this case, doors 39, 31 are pushed by conduit 59 to be readily opened. Then, valve 60 is opened to pour the foaming reaction mixture prepared in tank 56 through conduit 59 into mold 21. At this time, shaft 55 is rotated as required to tilt forward tank 56, thereby accelerating the discharge of the foamable reaction mixture.

Then, cylinder 54 is driven to retract its piston to retract tank 56, and doors 38, 30 are closed. Thereafter, the foaming reaction mixture is expanded by the foaming operation to rise, and contacted with the inner surface of jig 22 as shown in FIG. 6(B). Here, valve 36 of conduit 37 is opened after the foaming stock solution rises, and chamber 33 is connected to a vacuum pump, which evacuates chamber 33 in a predetermined amount. Then, from when the foaming reaction mixture is contacted with the inner surface of jig 22 as described above, jig 22 is lifted at the same speed as the rising velocity of the reaction mixture. As a result, even if the reaction mixture surface level rises due to the expansion of the forming reaction mixture, the top portion of the reaction mixture contacted with jig 22 is not effected by any frictional resistance. Thus, the drawback of the conventional foaming tank that the foaming is disturbed at the peripheral edge of the slab to lower the height when the reaction mixture is foamed can be eliminated, thereby attaining the polyurethane foam slab having a flat top surface.

When the polyurethane foam slab is being foamed and shaped in mold 21 as described above, the polyurethane foam stock solutions adhered to the inner surfaces of tanks 56, 61 retracted from mold 21 are cleaned as follows. Pump 69 is driven to supply cleaning solvent into tank 67 and to further fill cleaning solvent in tank 56. Then, blades 57 are rotated to dissolve the foaming reaction mixture adhered to the inner walls of tank 56, and valve 60 is then opened to discharge the solvent. When discharging the solvent, the foaming reaction mixture adhered to the inner wall of conduit 59 is also dissolved. The solvent thus discharged is stored in reservoir 68, fed by pump 69 to tank 67 for reuse.

When the cleaning is finished, next reaction mixture is prepared similarly as described above. After chamber 33 is returned to the original state, door 40 of chamber 33 is opened, mold 21 is exhausted out of chamber 33 by rollers 28, and another foaming mold is instead contained at a position as shown in FIG. 4 in chamber 33. Thus, the similar operation to that described above is repeated to continuously produce polyurethane foam slab.

According to the present invention as described above, jig 22 of the above-mentioned structure is risen upon rising of the forming reaction mixture when the reduced pressure chamber is evacuated to a predetermined pressure to foam the reaction mixture after the polyurethane foamable reaction mixture is agitated and poured in foaming mold 21. Therefore, the polyurethane foam slab having a flat top surface is provided by the use of jig 22, the vaporization efficiency of carbon dioxide gas is raised by foaming the reaction mixture under a predetermined reduced pressure to intensify the foaming operation, and the slab can be foamed to, for example, 5 to 10 kg/cm$^3$ of very low density. Further, various polyurethane foam slabs having different densities can be provided by the reaction mixture of the same mixture contents, and dangers of scorch phenomenon and a fire can be eliminated.

The construction of the apparatus for producing the polyurethane foam described with respect to the above-mentioned embodiment of the present invention is not limited to the above-described particular construction.

In the embodiment described above, the solenoid valve of the suction conduit is opened to evacuate the reduced pressure chamber by the vacuum pump as means for reducing the pressure in the reduced pressure chamber. However, the present invention is not limited to the particular embodiment. For example, the reduced pressure chamber may be evacuated by connecting, for example, the suction conduit to a reduced pressure tank which is reduced in advance under pressure.

In FIG. 5, ultrasonic sensor 71 is secured fixedly to the center of reinforcing bar 23 to detect the rising surface level of the foamable reaction mixture to start raising jig 22 when a distance to the rising surface level of the reaction mixture arrives at a predetermined value and to controllably synchronize the rising velocity of the foamable reaction mixture with the rising speed of jig 22. Thus, the conventional control of the rising timing and speed of the lifting jig by the operator's visual observation is replaced by sensor 71 which can automate the control of the lifting jig.

Figure 7:
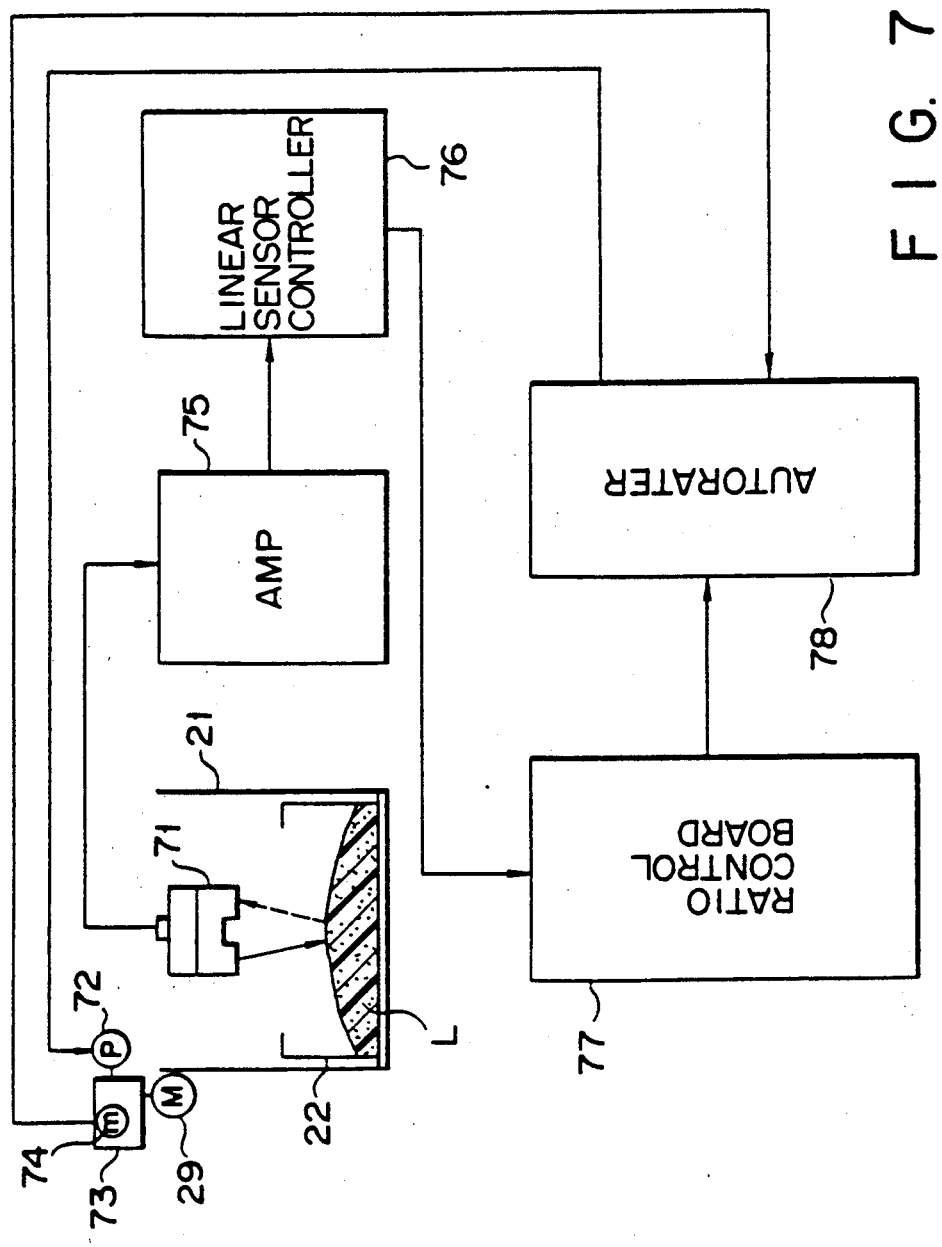
FIG. 7 is a block diagram showing a control mechanism with an ultrasonic sensor shown in FIG. 5.

A control mechanism for sensor 71 is constructed as shown in FIG. 7. The control mechanism has pilot lamp 72, a ring cone 73, and a magnetic sensor 74 contained in cone 73. The mechanism further has an amplifier 75, a linear sensor controller 76, a ratio control board 77 and an autorater 78.

A signal from sensor 71 is converted by amplifier 75 into a current signal, which is, in turn, inputted to rate control board 77. Control board 77 converts the input signal into a voltage signal, which is, in turn, inputted to autorater 78. The voltage signal is fed from autorater 78 to pilot motor 29 to control the variable speed of cone 73, thereby regulating the rising speed of jig 22. A speed feedback control signal is fed by the magnetic sensor 74 contained in cone 73 to autorater 78. Thus, autorater 78 synchronizes the rising velocity of the slab with the lifting speed of jig 22.

The foaming operation of the apparatus will be described with reference to FIGS. 8(A) to 8(D).

As shown in FIG. 8(A), foaming reaction mixture "L" is poured in mold 21 in the state lifting jig 22 is lowered to a predetermined position. Stock solution "L" is expanded by its foaming operation to rise. When the foamable reaction mixture rises to a predetermined height at the top surface level as shown in FIG. 8(B), motor 29 is driven by the control mechanism in FIG. 7. Thus, the timing of rising jig 22 is automatically regulated to always lift jig 22 at the proper timing. As shown in FIGS. 8(C) and 8(D), since the lifting speed of jig 22 is controlled in synchronization with the rising velocity of foaming reaction mixture "L", a drawback such as cracks of the foaming product due to the collapse of the rising balance in the conventional apparatus can be eliminated.

Figures 10, 11:
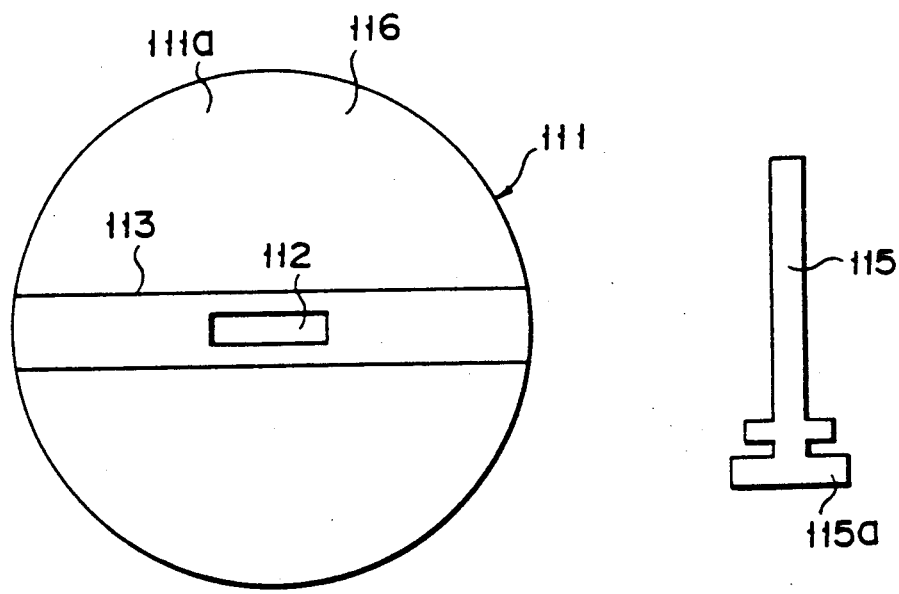
FIG. 10 is a plan view of the mold of FIG. 9 as seen from above.
FIG. 11 is a side view of a shaft used in the mold in FIG. 9.
Figure 12:
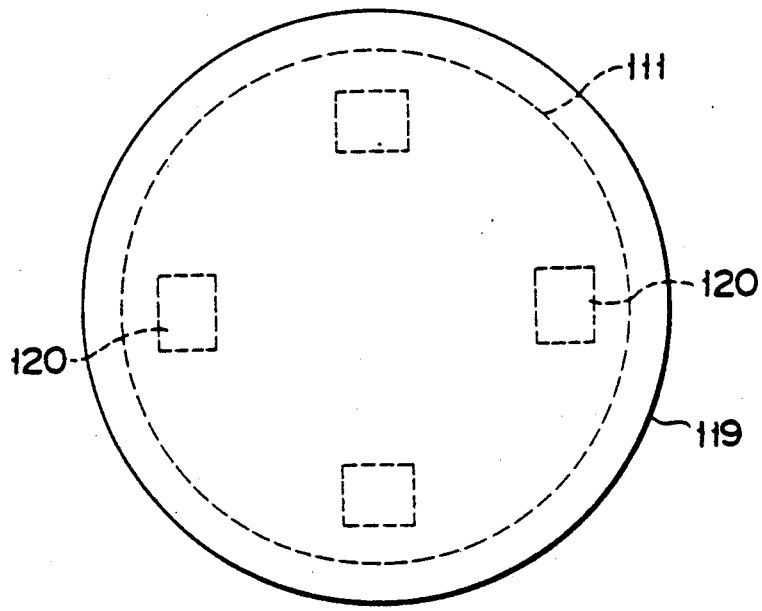
FIG. 12 is a view of the mold in FIG. 9 as seen from the bottom.

A second embodiment of the present invention will be described in detail with reference to FIGS. 9 to 12. FIG. 9 is a schematic view mainly showing the foaming mold of an apparatus for producing urethane foam according to the second embodiment of the present invention. The arrangement for supplying foamable reaction mixture into the foaming mold is constructed entirely in the same as that in FIG. 4, and the description thereof will be omitted. FIG. 10 is a plan view of the foaming mold of FIG. 9, FIG. 11 is a side view of a shaft used in the foaming mold, and FIG. 12 is a back view of the foaming mold.

The second embodiment of the apparatus comprises cylindrical foaming mold 111 having upper opening 111a. In opening 111a is provided bar 113 having shaft bore 112. End 115a of shaft 115 (FIG. 11) connected to motor 114 is engaged with bar 113. Motor 114 is rotated to rotate mold 111 itself via shaft 115 and bar 113. Foaming reaction mixture inlet 116 is opened at the side wall of mold 111, and openable door 117 is provided in inlet 116. Mold 111 is disposed on supporting pedestal 119 having rollers 118 disposed underneath its bottom, through rollers 120.

Mold 111 is contained in reduced pressure chamber 121. Feed conduit 123 is connected through solenoid valve 122 to the top of chamber 121. Suction conduit 125 is connected through solenoid valve 124 to the lower portion of chamber 121, and also connected to vacuum pump (not shown). Foamable reaction mixture inlet 126 is opened at the side of chamber 121 at a position corresponding to inlet 116, and openable door 127 is provided in 126. Laterally openable door 128 for introducing and exhausting mold 111 is formed at the side wall of chamber 121. The mold has conveyor 129 for conveying mold 111 and gauge 130 attached to chamber 121.

Then, the operation of the apparatus of the construction described above will be described.

After mold 111 is contained in chamber 121 as shown in FIG. 9 (in the state valves 122, 124 are closed), the end of conduit 59 is inserted through inlets 126, 116 into 111. Then, the foamable reaction mixture prepared in the mixing and agitating mold (FIG. 4) is poured through conduit 59 into mold 111. Thereafter, the agitating mold is retracted, and doors 127, 117 are closed. Subsequently, after the foaming reaction mixture starts rising, valve 122 of conduit 123 is opened, solenoid 124 is opened, and chamber 121 is then evacuated by a vacuum pump. Then, the foaming mold itself is rotated through shaft 115 and bar 113 by motor 114. Here, the rotating speed of mold 111 is determined according to the rise of the foamable reaction mixture, for example, at approx. 20 to 120 revolutions/min. As a result, centrifugal force is acted in the foamable reaction mixture in mold 111 so that the foamable reaction mixture surface level rises near the portion contacted with the inner walls of the foaming mold substantially similarly to the central portion to attain polyurethane foam slab having a flat top surface and very low density.

After the foaming of the reaction mixture is finished as described above, chamber 121 is returned to the initial state, door 128 of chamber 121 is then opened, mold 111 is exhausted by rollers 118, and another foaming mold is instead contained at a position shown in FIG. 9. Thus, the similar operation to that described above is repeated to continuously produce urethane foam slab.

According to the present invention as described above, the reduced pressure chamber is evacuated to a predetermined pressure and foaming mold 111 is properly rotated at foaming time after the polyurethane foam stock solution is agitated and poured in foaming mold 111. Therefore, the foamable reaction mixture near the inner walls of the foaming mold is risen substantially in the same degree as the foamable reaction mixture at the center by the centrifugal force to attain the polyurethane foam slab having a flat top surface and thus having infralow density such as 5 to 10 kg/m$^3$. Further, various polyurethane foam slabs having different densities can be provided by the reaction mixture of the same mixture contents, and dangers of scorch phenomenon and a fire can be eliminated.

In the embodiment described above, the shapes of the shaft connected to the motor and the bar of the foaming mold are not limited to the above-mentioned particular constructions. In other words, since the rotating force of the motor may be transmitted to the foaming mold, various constructions of connecting the shaft and the bar may be considered and employed.

The construction of the apparatus for producing the polyurethane foam described with respect to the above-mentioned embodiment of the present invention is not limited to the above-described particular construction.

Figure 13:
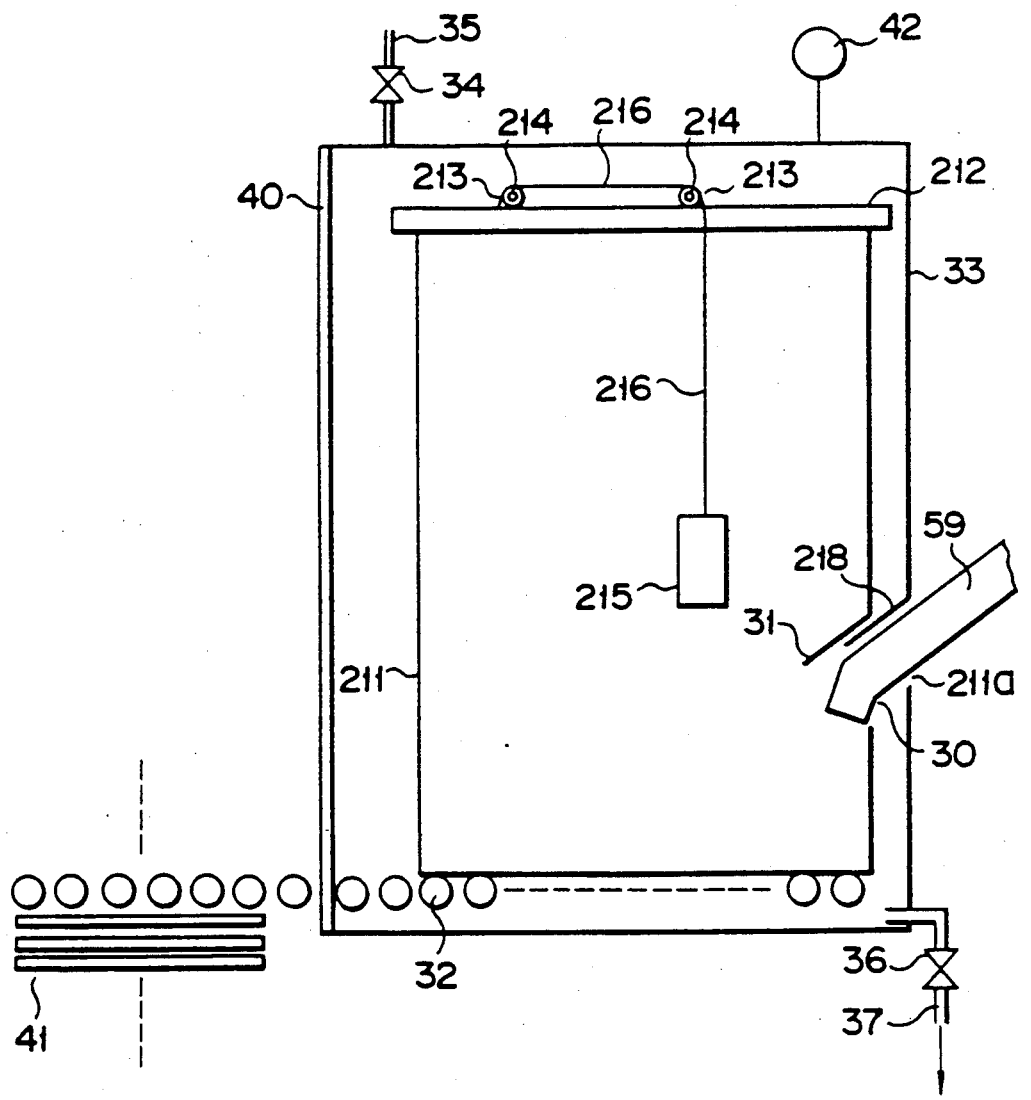
FIG. 13 is a schematic view showing the foaming mold of an apparatus for producing polyurethane foam according to still another embodiment of the invention.
Figure 14:
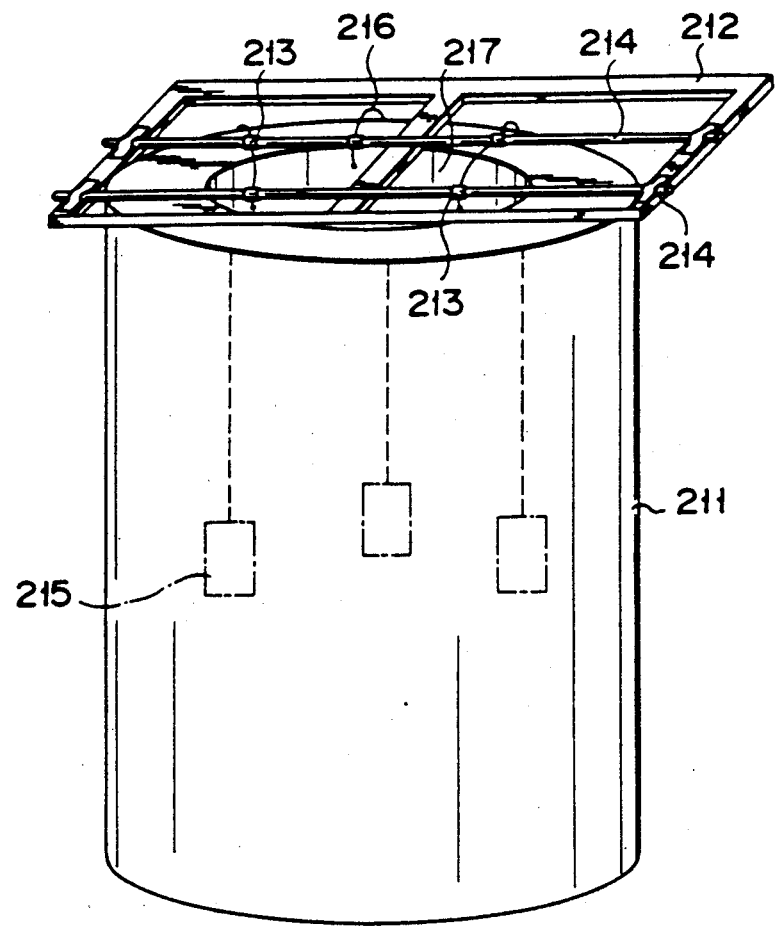
FIG. 14 is a perspective view of the mold of FIG. 13.

A third embodiment of the present invention will be described with reference to FIGS. 13 to 15(A) to 15(C). FIG. 13 is a schematic view mainly showing the foaming mold of an apparatus for producing urethane foam according to the third embodiment of the present invention. The arrangement for supplying foamable reaction mixture into the foaming mold is constructed entirely in the same as that in FIG. 4, and the description thereof will be omitted. FIG. 14 is a perspective view of the foaming mold of FIG. 13, FIGS. 15(A) to 15(C) are schematic views sequentially showing the foaming stages.

The third embodiment of the apparatus comprises cylindrical foaming mold 211 opened at its top. A frame 212 is provided on mold 211. In frame 212, rotational shafts 214 on which sprockets 213 are respectively mounted are provided at predetermined positions. Three chains 216 for hanging balancers 215, respectively, at one respective ends from sprockets 213, are engaged with sprockets 213 in such a manner that one ends of chains 216 are extended outside mold 211. The other ends of chains 216 are attached in good balance to the upper surface side of a weight 217 having a flat back surface and disposed in mold 211. A polyurethane foam sheet, not shown, is bonded to the back surface of weight 217. Foaming reaction mixture inlet 211a is opened at the side wall of mold 211, and openable door 218 is provided in inlet 211a. The other construction is the same as that in FIG. 4, and the same reference numerals as those in FIG. 4 indicate the same elements, and the description thereof will be omitted. Various units, not shown, for supplying the foaming reaction mixture to mold 211 are provided near mold 211 similarly to that of FIG. 4.

Then, the operation of the apparatus of the construction described above will be described.

After mold 211 is contained in chamber 33 as shown in FIG. 13 (in the state valves 34, 36 are closed), the end of conduit 59 is inserted through inlets 211a, 30 into mold 211. Then, the foamable reaction mixture prepared in the mixing and agitating mold (FIG. 4) is poured through conduit 59 into mold 211. Thereafter, the agitating mold is retracted, and doors 31, 218 are closed. Subsequently, after the foaming stock solution starts rising, valve 34 of conduit 35 is opened, solenoid 36 is opened, and chamber 121 is then evacuated by a vacuum pump. Then, the foamable reaction mixture prepared in the mixing and agitating mold is poured through conduit 59 into mold 211 similarly to that in FIG. 4.

Thereafter, the mixing and agitating mold is retracted, and doors 31, 218 are closed. In this case, the state of the foamable reaction mixture in mold 211 is as shown in FIG. 15(A). In mold 211, the foamable reaction of the polyurethane foamable reaction mixture and the rise of the foamable reaction mixture are proceeded. In the meantime, when the rise of the foamable reaction mixture is advanced, for example, by approx. 70%, the weight disposed in the upper portion of mold 211 is dropped downward as shown in FIG. 15(B). As a result, the foamable reaction mixture rises while the foaming stock solution lifts weight 217 in mold 211 to attain predetermined polyurethane foam slab 218 (FIG. 15(C)).

After the foaming of the reaction mixture is finished as described above, chamber 121 is returned to the initial state, door 128 of chamber 121 is then opened, mold 211 is exhausted by rollers 218, and another foaming mold is instead contained at a position shown in FIG. 13. Thus, the similar operation to that described above is repeated to continuously produce urethane foam slab.

According to the present invention as described above, the reduced pressure chamber is evacuated to a predetermined pressure after the polyurethane foamable reaction mixture is agitated and poured in foaming mold 211. Further, the rise of the foamable reaction mixture is started, and when the rise of the reaction mixture is proceeded by approx. 70%, weight 217 is placed on the reaction mixture to complete the rise of the reaction mixture. Therefore, the rise of substantially the center of the rising foamable reaction mixture in mold 211 is suppressed by weight 217, and the periphery of the foamable reaction mixture is not contacted directly with weight 217 to thereby freely rise, thus eventually providing the entire uniform top surface of the foamable reaction mixture to attain cylindrical polyurethane foam slab having a flat top surface.

In the embodiment described above, the weight is placed on the foamable reaction mixture when the rise of the foamable reaction mixture is advanced by approx. 70%. However, the invention is not limited to the particular embodiment. For example, the weight may be placed on the foamable reaction mixture properly from when the rise of the foamable reaction mixture is proceeded by approx. 70% to any time immediately before the rise of the foamable reaction mixture is completed.

The construction of the apparatus for producing the polyurethane foam described with respect to the above-mentioned embodiment of the present invention is not limited to the above-described particular construction.

According to the present invention as described above, the rise of the foamable reaction mixture is started after the properly mixed and agitated polyurethane foamable reaction mixture is poured in the foaming mold, the weight having flat back surface is placed on the top surface of the foamable reaction mixture in the foaming mold from above to complete the rise of the foamable reaction mixture during a time period beginning immediately as the reaction mixture begins to rise and ending when the rise of the foaming reaction mixture has proceeded by approx. 70%, thereby attaining the polyurethane foam slab having a flat top surface. Therefore, the cutting of the top raised portion of the conventional foamable reaction mixture to form a predetermined flat top shape can be eliminated, the wasteful slab can be obviated, and the cutting step can be omitted.

In the present invention, the material of the weight employs various metals or plastics. It is preferable to employ the foam sheet having continuous air bubbles such as polyurethane foam sheet for escaping gas (carbon dioxide gas) produced due to the foamable reaction on the back surface of the weight.

Further, the weight of the weight to be placed on the foamable reaction mixture is determined generally according to the rising velocity of the foamable reaction mixture, the strength of the foaming gel, and the size of the foaming mold, and is preferably 0.5 to 2.0 g/cm². If the weight is approx. 0.5 to 2.0 g/cm². If the weight is excessively heavy, it suppresses the foaming and simultaneously disturbs the foamable reaction to thereby cause the foamable reaction mixture to crack. If the weight is excessively light, the weight is raised from the top of the foamable reaction mixture as it is to disable the flat top surface of the foamable reaction mixture to be provided.

In the present invention, the polyurethane foamable reaction mixture may suitably employ polyols such as polyether polyol, polyester polyol, organic isocyanate such as tolylene diisocyanate, amine catalyst, tin catalyst, foaming agent (water), foam stabilizer (silicone oil), and pigments, fillers in combination as required for properties to be used.

In the embodiment described above, the weight is used at any time immediately before the rise of the foamable reaction mixture is completed after the rise of the foamable reaction mixture is advanced by approx. 70%. If the rise of the foaming stock solution is lower than 70%, the gel is weakened so that the foamable reaction mixture cannot support the weight to thereby disturb the foamable reaction of the reaction mixture.

What is claimed is:

1. A batch type foaming apparatus for producing a urethane foam slab comprising a cylindrical foaming mold contained within a vacuum chamber, said mold having a flat bottom, sides perpendicular to the bottom, and an open top, a cylindrical lifting jig opened at opposite ends, and said jig having a wall elevationally movably provided along the inner surfaces of the side walls of said mold to provide a foaming chamber between said movable wall and said flat bottom, a plurality of rotational shafts at an equal speed horizontally above said container, sprockets provided at the shafts for synchronously rotating the shafts at an equal speed and sprocket chains wound between the sprockets, and lifting wires connected at one end to an upper end of said jig and at the other end to the shafts, thereby rotatably driving the shafts to wind up the wires when pouring and foaming a foamable polyurethane reaction mixture in said mold to lift said jig synchronously with the rise of the top surface level of said reaction mixture, and ultrasonic sensor means coupled to the jig for detecting a distance between the sensor means and the surface level of said reaction mixture to operate the driving means when the distance between the sensor means and the rising surface of the reaction mixture comes within a predetermined value, thereby lifting the jig synchronously with the rising velocity of the reaction mixture.

2. The batch type foaming mold according to claim 1, wherein said cylindrical foaming mold is rotatable at its central axis as a center.

* * * * *

UNITED STATES PATENT AND TRADEMARK OFFICE
CERTIFICATE OF CORRECTION

PATENT NO. : 4,988,271
DATED : January 29, 1991
INVENTOR(S) : KUMASAKA ET AL It is certified that error appears in the above-identified patent and that said Letters Patent is hereby corrected as shown below:

TITLE PAGE:

Section [30] Foeign Application Priority Data:

Change JP "62-37415" to --62-57415--.

Section [56] References Cited (Foreign Patent Applications):

- Change "60-23720 1/1978 Japan" to --62-23720 1/1987 Japan--.

- Insert --1204388 11/1965 Germany--.

Signed and Sealed this

First Day of September, 1992

*Attest:*

DOUGLAS B. COMER

*Attesting Officer*     *Acting Commissioner of Patents and Trademarks*